INVENTOR.
Perry J. Rieppel
Melvin C. Clapp
Edwin G. Elliott, Jr.

BY Gray, Mase, & Dunlap

ATTORNEYS.

United States Patent Office 2,819,883
Patented Jan. 14, 1958

2,819,883

PRESSURE-WELDED TUBING TURN

Perry J. Rieppel, Worthington, and Melvin C. Clapp and Edwin G. Elliott, Jr., Columbus, Ohio, assignors, by mesne assignments, to The Metal Specialty Company, Cincinnati, Ohio, a corporation of Ohio Application August 25, 1954, Serial No. 452,083

3 Claims. (Cl. 257—256)

This invention relates to pressure welding and, more in particular, to an improved heat-exchange unit of aluminum or aluminum alloys formed by a pressure-welding method.

Pressure welding of sheets of aluminum or similar materials to form heat-exchange units is a well-known art. This process consists primarily in inserting the materials to be welded together between a pair of dies, and then closing the dies until a predetermined deformation has occurred in the metal sheets. The welding may be done either with, or without, the application of heat to the material being welded. When heat is applied to the process, however, the necessary deformation to obtain a good weld is somewhat reduced, and the necessary pressure applied to the dies is much less in the case where heat is applied to the sheets to be welded. In the forming of heat exchangers by this process, either one or both of these sheets is formed so that a continuous tubing appears between the sheets when they are welded together. In order for the tubing to withstand the pressures usual in heat-exchange systems the sheets are usually welded together by a continuous pressure-welding seam adjacent the periphery of the tubing. The tubing in the sheets may be formed either by stamping or similar processes prior to the welding operation, or the forming may be done simultaneously with the pressure welding by using formed dies and injecting a gas pressure between the sheets when the sheets are being welded together. Such methods are disclosed in the copending application of Perry J. Rieppel, Melvin C. Clapp, and Edwin G. Elliott, Jr., filed March 10, 1954, Serial No. 415,272, and in the article "Manufacture of Light Alloy Charged Cooler Element" by H. Herrmann in Metal Industry, February 22, 1946, pp. 143–147.

It is well known that heat-exchange units may also be made by other methods, such as by spot-welding preformed sheets together. In these methods, the sheets are generally made of steel and, although advantages may be derived from the greater strength inherent in steel sheets, they do not have as desirable heat-transfer characteristics as aluminum or aluminum alloys, which are not readily spot-welded. It is also more difficult to form steel sheets.

In the formation of tubing in pressure-welded aluminum heat-exchange units, difficulty has been encountered in the formation of units capable of withstanding the pressures normally encountered in heat-exchange systems without increasing the thickness of the metals to such an extent that pressure-welding the sheets is impractical. When a series arrangement of tubing is used, the tubing generally has a plurality of straight sections joined at the ends by a curved (e. g., half-turn) section. It has now been found that the dimensions of these curved sections are very critical, in pressure-welded units, in order to obtain the maximum benefit from the unit. These dimensions are dependent upon the cross-sectional area and shape of the tubing as well as on the thickness of the sheets.

It is, therefore, an object of this invention to provide a pressure-welded, heat-exchange unit from aluminum or pressure-weldable alloys of aluminum having maximum utilization of the heat-exchange surfaces.

It is also an object to provide a pressure-welded, heat-exchange unit from aluminum or pressure-weldable alloys of aluminum, in which the turns in tubing of the unit provide for maximum utilization of the heat-exchange surfaces without impairing the strength of the unit.

A further object of this invention is to provide a pressure-welded, heat-exchange unit from aluminum or pressure-weldable alloys of aluminum, in which the dimensions of curved sections in tubing in the unit have the optimum values for strength and utilization of the heat-exchange surfaces.

Other objects and advantages of this invention will become apparent from the following specifications, the appended claims, and the included drawings.

Figure 1:
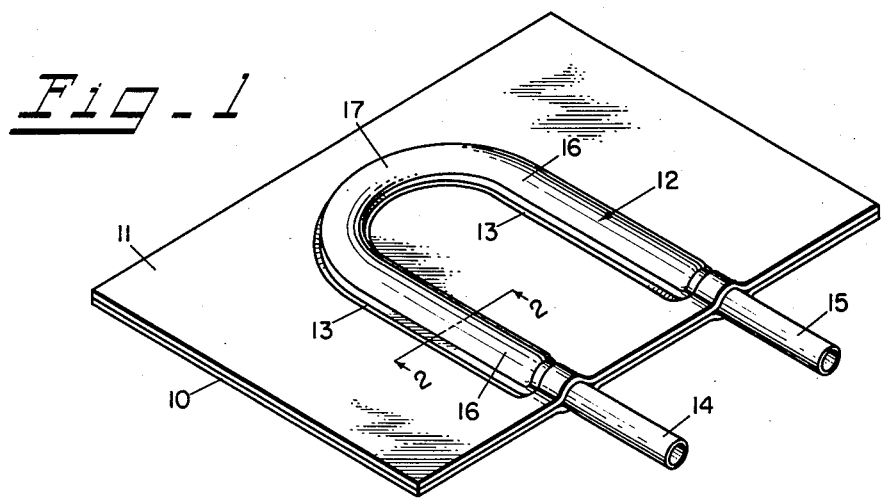
Fig. 1 is a perspective view of a pressure-welded heat-exchange unit illustrating a half-turn section of tubing joined to straight sections of tubing.
Figure 2:
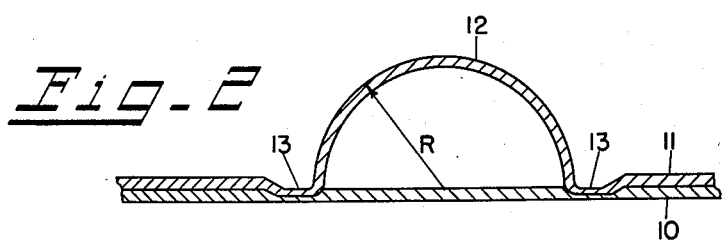
Fig. 2 is an enlarged cross-sectional view along the section 2—2 of the heat-exchange unit of Fig. 1, illustrating the typical shape of tubing in the unit.
Figure 3:
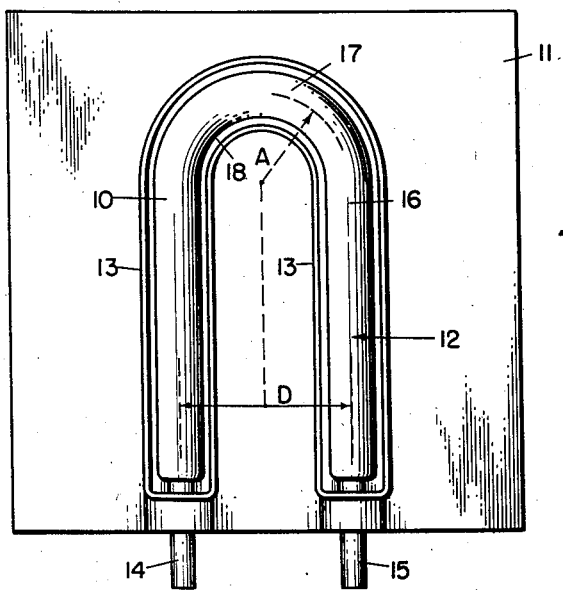
Fig. 3 is a top view of the heat-exchange unit of Fig. 1, illustrating a half-turn section of tubing joining two straight sections of tubing.

Referring now to Figs. 1 and 3, a typical heat-exchange unit embodying the principles of this invention is comprised of a bottom sheet 10 and a top sheet 11. These sheets are aluminum or pressure-weldable alloys of aluminum. A continuous tube 12 is formed in one of the sheets and, as has been previously stated, this tube may be formed either before the welding operation or simultaneously therewith. The sheets are joined together by a continuous pressure-weld 13 surrounding the tube 12. Suitable outlets, such as tubes 14 and 15, are provided to communicate with the tube 12. The tube 12 has two straight portions 16 connected by a curved (in this case a half-turn) section 17. A cross-sectional view of the tube is illustrated in Fig. 2. From this view, it is seen that the tube 12 has a substantially semicircular cross section with a radius R and that the pressure-welds 13 are immediately adjacent the sides of the tube, welding top sheet 11 to bottom sheet 10. Exterior deformation from pressure-welds 13 may appear only in top sheet 11, as shown in Fig. 2, or it may appear only in the bottom sheet 10, or in both sheets. The center of curvature of radius R may be located a short distance either side of a center line between the sheets, if desired.

Referring again to Fig. 3, the tubes are located with a distance D between their center lines, and the curved section has a radius A to its center line. When the tubes 16 are parallel, the distance D will be equal to the diameter of the half turn.

In one example it has been found that the optimum radius A of the curve is about 1 inch when the radius R of the tubing is 3/16 inch and the thickness of sheet 11 is about 40 mils and is either aluminum or a pressure-weldable aluminum alloy. If desired, the bottom sheet 10 may be somewhat thicker to reduce any danger of bulging when only one sheet is formed. When the radius A is less than 1 inch, it has been found that the inside radius 18 of the turn is too weak to withstand normal operating pressures, and when the radius A is greater than about 1 inch the maximum utilization of the heat-exchange surface is not obtained, since the tubes 16 must be a further distance apart.

When the radius of the tubing is greater than 3/16 inch or the thickness of the sheets is less than 0.04 inch, the minimum radius of the curved section is greater than about 1 inch, and, similarly, when the radius of the tubing is less than 3/16 inch or the thickness of the sheets is greater than 0.04 inch, the radius of the curved section may be less than about 1 inch.

It will be understood, of course, that, while the forms of the invention herein shown and described constitute preferred embodiments of the invention, it is not intended herein to illustrate all of the possible equivalent forms or ramifications of the invention. Thus, while the invention has been particularly described with reference to a heat-exchange unit formed from sheets of aluminum, it is also contemplated that various pressure-weldable aluminum alloys may also be used. It will also be understood that the words used are words of description rather than words of limitation, and that various changes may be substituted without departing from the spirit or scope of the invention herein disclosed.

What is claimed is:

1. In a pressure-welded heat-exchange unit, formed from a pair of sheets of aluminum or pressure-weldable aluminum alloy, a tubing formed in one of said sheets, said one sheet being about 0.04 inch thick, said tubing being substantially semicircular in cross section and having a radius of about 3/16 inch, a curved section in said tubing, said curved section having a radius of about 1 inch measured from the center line of said tubing.

2. In a heat-exchange unit formed from a pair of sheets of aluminum or pressure-weldable aluminum alloy, a tubing formed in one of said sheets, said one sheet being about 0.04 inch thick, said tubing being substantially semicircular in cross section and having a radius of about 3/16 inch, a curved section in said tubing, said curved section having a radius of about 1 inch measured from the center line of said tubing, said sheets having a continuous pressure-weld adjacent the periphery of said tubing.

3. In a heat-exchange unit formed from a pair of sheets of aluminum or a pressure-weldable aluminum alloy substantially 0.04 inch thick, a tubing formed in one of said sheets, said tubing being substantially semicircular in cross section and having a radius of about 3/16 inch, a half turn in said tubing, said turn having a radius of about 1 inch measured from the center line of said tubing, said sheets having a continuous pressure-weld adjacent the periphery of said tubing.

References Cited in the file of this patent

UNITED STATES PATENTS

| | | |
|---|---|---|
| 2,271,437 | Lewis | Jan. 27, 1942 |
| 2,306,772 | Benson | Dec. 29, 1942 |
| 2,522,408 | Sowter | Sept. 12, 1950 |